LOGARITHMIC CONVERTER CIRCUIT

Filed June 16, 1953

INVENTOR,
MILTON GREEN

BY Harry M. Saragovitz

ATTORNEY

United States Patent Office 2,861,182

Patented Nov. 18, 1958

2,861,182

LOGARITHMIC CONVERTER CIRCUIT

Milton Green, Little Silver, N. J., assignor to the United States of America as represented by the Secretary of the Army Application June 16, 1953, Serial No. 362,171

2 Claims. (Cl. 250—27)

(Granted under Title 35, U. S. Code (1952), sec. 266)

The invention described herein may be manufactured and used by or for the Government for governmental purposes, without the payment of any royalty thereon.

This invention relates to electrical circuits and more particularly to electrical circuits having an output logarithmical with respect to their input.

The voltage $e_1$ developed across a germanium diode in the conducting or forward direction varies as the logarithm of the positive direction current $i_1$ through it over a very short range, usually about a half decimal cycle. Thereafter the voltage increases more rapidly with increasing current than it would if it had a true logarithmic characteristic. In terms of differential resistance, which is defined as the ratio of a smal change in voltage, $de_1$, across the diode to the corresponding increase in current, $di_1$, through it, the crystal diode has a differential resistance which, except for the short half decimal cycle, is too great to satisfy the requirements of a logarithmic characteristic. The positive direction current $i_1$ is defined as that current path through the diode offering minimum resistance. The easy electron current path through the diode will, of course, be opposite to the positive direction current.

It is therefore an object of the present invention to provide an improved logarithmic converter which compensates for the non-logarithmic differential resistance.

It is another object of the present invention to provide an improved logarithmic converter circuit having a true logarithmical output with respect to the input over a substantial range of decimal cycles.

It is yet another object of this invention to provide an improved logarithmic converter adapted to operate with input and output impedances of any magnitude.

In accordance with the invention, a logarithmic converter comprises a source of input current applied to a plurality of non-linear impedance devices connected in series across a pair of input terminals and having a predetermined path of positive direction current flow from one of said terminals to the other. The converter also comprises a vacuum tube having its input circuit responsive to the voltage developed across the non-linear impedance devices by the application of the input positive direction current whereby the electron current flow in said vacuum tube varies inversely with respect to the voltage developed across the non-linear impedance devices by the positive direction current. Also included are means for operating the tube as a non-linear impedance over a predetermined range of the input current whereby the current output of the vacuum tube is proportional to the logarithm of the input current.

For a better understanding of the invention, together with other and further objects thereof, reference is had to the following description taken in connection with the accompanying drawing in which.

Figure 1:
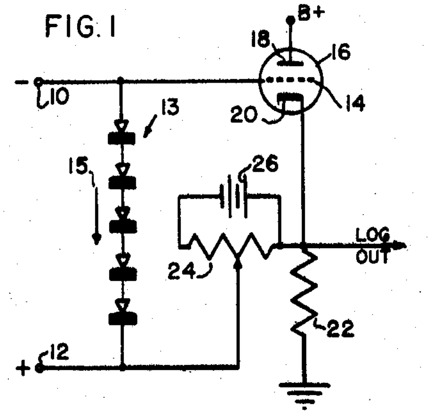
Figure 1 is a schematic diagram of a typical embodiment of the invention.

Referring now to Figure 1 of the drawing, there is shown a logarithmic converter including a pair of input terminals 10 and 12. A plurality of non-linear impedance devices 13, preferably five in number as shown, are serially connected across input terminals 10 and 12 so that the path of easy electron current flow from input terminal 10 to input terminal 12 is as indicated by the arrow 15. A non-linear device is one whose impedance is not a constant but changes under different conditions of current and voltage. One example of such a device is a crystal diode such as that commercially designated as the 1N69 or 1N70 germanium diode. Input terminal 10 is also connected to control grid 14 of a triode vacuum tube 16. Plate 18 of vacuum tube 16 is connected directly to B+ and cathode 20 of vacuum tube 16 is connected to ground through resistor 22. Cathode 20 is connected to input terminal 12 through a biasing potentiometer 24 which is connected across D.-C. biasing source 26, the positive terminal of source 26 being connected to cathode 20. The D.-C. biasing voltage is thus applied to grid 14 through potentiometer 24 and crystal diodes 13. This biasing voltage is of such a value that vacuum tube 16 is biased negatively so that with no signal supplied to the diodes (quiescent state), the plate current is at the beginning of the non-linear portion of the static $e_g—i_p$ curve at a predetermined plate potential.

Figure 2:
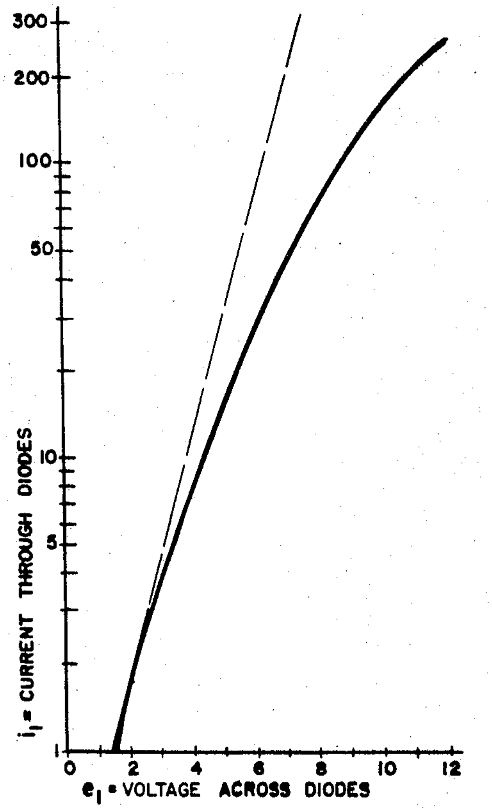
Figures 2 and 4 are explanatory curves showing the operating characteristics of the circuit shown in Figure 1.

To better understand the operation of the converter, reference is made to Figure 2 which shows the current-voltage characteristic of five 1N69's in series plotted on semi-logarithmic coordinates. The solid line curve represents the actual measured positive direction current-voltage response across the five germanium diodes while the dashed line represents a curve showing the desired true logarithmic response thereacross. By definition, the differential resistance of the diodes is $$r=\frac{de_1}{di_1} \qquad (1)$$

where the subscript 1 refers to the germanium diodes. Now, it is well known that an electric circuit component is logarithmic over a certain range of current and/or voltage if it satisfies the equation $$Y-Y_0=K \log \frac{X}{X_0} \qquad (2)$$

where

X represents the input current or voltage;
Y is the corresponding output current or voltage;
$X_0$ and $Y_0$ are corresponding input and output reference currents or voltages; and
K is a constant.

Thus, for a logarithmic response across the diodes in accordance with Equation 2 we have $$e_1-e_0=K \log \frac{i_1}{i_0} \qquad (3)$$

where $e_1$ is the output voltage across the diodes;
$i_1$ is positive direction current through the diodes;
$e_0$ is a reference or bias voltage; and
$i_0$ is the current through the diodes corresponding to the reference voltage $e_0$.

For a constant plate voltage $E_p$ (herein chosen to be 75 volts), the transconductance G of vacuum tube 16 is $$G=\frac{di_p}{de_g} \qquad (4)$$

Since in Figure 1 the voltage developed across the crystal diodes 13 by the positive direction current is also the input grid voltage to vacuum tube 16, then, with electron flow through the diodes in the direction of the arrow 15 and $e_g$ of tube 16 measured in the usual manner, it is obvious that $$de_1 = de_g \quad (5)$$

From Equation (1) we have $$r di_1 = de_1 \quad (6)$$

and, substituting Equations 4 and 5 in 6 we have $$-r(di_1) = \frac{(di_p)}{G} \quad (7)$$

The negative sign in (7) means that the differential currents have opposite signs, that is, if there is an increase in $i_1$ then there must be a decrease in $i_p$ and vice versa. The significance of the negative sign in Equation 7 may more readily be understood when it is considered that the easy electron current flow through the serially connected diodes 13 is opposite to the electron plate current flow, $i_p$, through tube 16 from cathode 20 to plate 18. With such an arrangement any increase of positive direction current, $i_1$, through the serially connected diodes 13 from terminal 12 to terminal 10 increases the bias applied to grid 14 in a negative direction and hence there is a corresponding decrease in tube plate current $i_p$. Similarly, if the positive direction current flow decreases then the electron plate current $i_p$ will decrease. Hence, it can be said that there is an inverse relationship between the positive direction current and the electron plate current flow through tube 16. Now, from Equation 7 we have $$(di_p) = -rG\ (di_1) \quad (8)$$

But for the output tube current $i_p$ to be logarithmic with respect to $i_1$ diode input current, it must satisfy the equation $$i_p - i_{p0} = K \log \frac{i_1}{i_0} \quad (9)$$

and differentiating (9) we get as a result $$(di_p) = \frac{K}{i_1}(di_1) \quad (10)$$

Now comparing Equations 8 and 10 we find that $$\frac{K}{i_1} = -rG \quad (11)$$

or $$K = -rGi_1 = \text{constant} \quad (12)$$

If the range in current for a logarithmic response through the diodes is for two decimal cycles, then $$\frac{i_1}{i_0} = 100 \quad (13)$$

Now, let $r_{max}G_{max}$ and $r_0$ and $G_0$ represent the respective values of $r$ and G at these two diode currents, then, from Equation 12 it follows that $$i_{1max} r_{max} G_{max} = i_0 r_0 G_0 \quad (14)$$

or $$\frac{i_{1\,max}}{i_0} \times \frac{r_{max}}{r_0} = \frac{G_0}{G_{max}} \quad (15)$$

Since $$\frac{i_{1\,max}}{i_0}$$

is the decimal cycle range desired, it is a known quantity. The ratio of $$\frac{r_{max}}{r_0}$$

is determined from the characteristics of the germanium crystal diodes and thus the ratios of $$\frac{G_0}{G_{max}}$$

can be determined from Equation 15. For example, for five 1N69's in series, the differential resistance at 1 microampere is 120 kilohms and at 100 microamperes it is 26 kilohms; hence from Equation 15 it is found that $$\frac{G_1}{G_{100}} = \frac{2.6}{120} \times 100 = 2.17 \quad (16)$$

It has been determined that the voltage across the diodes at 1 microampere current is 0.15 volt and at 100 microamperes current it is 0.9 volt. Thus, as the current changes from 1 to 100 microamperes, the voltage will change from 0.15 volt to 0.90 volt, or a total swing of 0.75 volt. This will also be the voltage excursion on the grid of the vacuum tube triode 16, but in the negative direction. To determine analytically the operating bias $e_c$ which satisfies the condition of Equation 16, subject to the condition that the grid voltage swing is −0.75 volt, a curve may be constructed plotting the ratio of $$\frac{G(e_g)}{G(e_g + 0.75)}$$

as the ordinate versus $e_g$ as the abscissae. From this curve it was found that for an ordinate of 2.17 (Equation 16), the corresponding grid bias should be −2.8 volts. This was checked experimentally and found to be approximately correct for the 75-volt plate supply. For a plate voltage of 67.5 volts, it has been found that over a wide range of 1 to 100 microamperes, a curve plotted with the logarithm of the input current ($i_1$) as the ordinate and the numerical values of the output current ($i_p$) as abscissa, closely approximates a straight line if the bias is −2.4 volts, which is in the range of the non-linear portion of the static $e_g$—$i_p$ curve. This is clearly shown in Figure 4. The curve leans slightly to the left and slightly to the right when values of bias are respectively decreased and increased from −2.4 volts. This allows for flexibility so that in case the circuit should be employed in connection with an amplifier which is not absolutely linear, it may be possible to get the desired type of output response by compensating through variation in the grid bias. It can thus readily be seen that any applied signal or current through the diodes drives the triode more negative causing the plate current to diminish, but, because of the non-linear characteristic, the plate current diminishes less rapidly with increasing voltage which in effect corrects for the too rapid increase in voltage of the diodes with plate current. This compensates for the deviation of the diode current-voltage characteristic from a true logarithmic one, thus resulting in a logarithmic characteristic curve between the plate current $i_p$ and the diode input current $i_1$. The logarithmic output voltage is developed across cathode resistor 22 which is a linear impedance device.

It is to be understood, of course, that one 1N69 germanium diode may be used if desired. In this case the ratio of $$\frac{G_1}{G_{100}}$$

would be the same, namely −2.17, but the grid voltage swing would have been one-fifth as great, namely, 0.15 volt; the corresponding grid voltage in this case would be approximately −5 volts.

Figure 3:
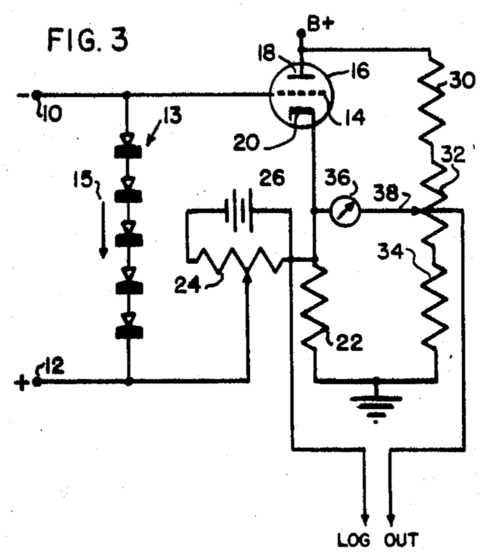
Figure 3 is another embodiment of my invention.
Figure 4:
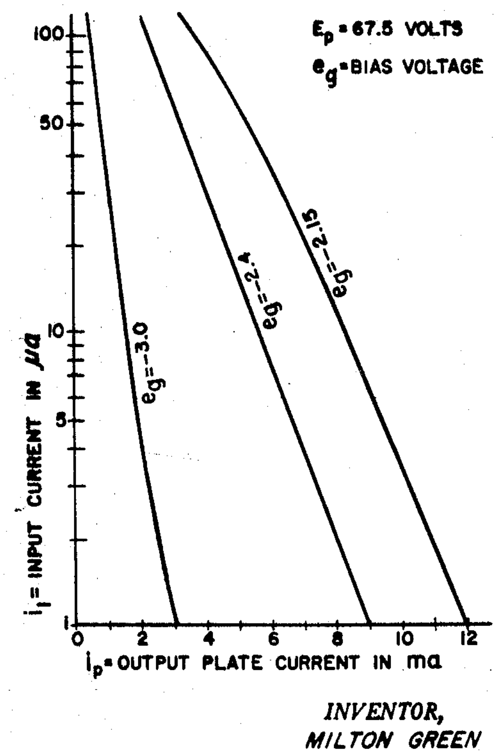

It is apparent from the curve shown in Figure 4 that the circuit of Figure 1 has a non-zero output for zero signal input. In Figure 3 resistor 30, potentiometer 32 and resistor 34 are serially connected between plate 18 and ground. A meter 36 is connected between cathode 20 and potentiometer arm 38 and is adjusted so that meter 36 reads 0 when the input current to input terminals 10 and 12 is 1 microampere.

Although the invention has been described as a converter for deriving an output current proportional to the logarithm of the input current, it is to be understood that an output voltage proportional to the logarithm of the input voltage may be derived by merely inserting a relatively high resistance in series with the input source, preferably 10 megohms. Of course if the internal resistance of the input source is high, the series resistor need only be large enough so that the sum of the two is about 10 megohms. For such a case, it has been found that the output voltage will be logarithmic up to one volt input at the input terminals.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A logarithmic converter comprising first and second input terminals, a source of input current applied to said terminals, a plurality of non-linear impedance devices connected in series across said input terminals and having a continuous path of easy electron current flow from said first terminal to said second terminal, a vacuum tube having at least a plate, a cathode, and a grid, and its cathode-to-plate electron current path opposite to said easy electron current flow, said first terminal being connected to said grid, and bias means in circuit with said second terminal and said cathode for operating said tube as a non-linear impedance over a predetermined range of said input current whereby the current output of said tube is proportional to the logarithm of said input current.

2. A logarithmic converter comprising first and second input terminals, a source of input current applied to said terminals, a plurality of diode non-linear impedance devices connected in series across said input terminals and having a continuous path of easy electron current flow from said first terminal to said second terminal, a vacuum tube having at least a plate, a cathode, and a grid connected to the first terminal, the cathode-to-plate electron current path being opposite to said easy electron current flow, a source of bias potential having its positive terminal connected to said cathode and having its negative terminal connected to said second input terminal, said bias potential being of such a value that said tube operates as a non-linear impedance over a predetermined range of said input current whereby the current output of said tube is proportional to the logarithm of said input current.

References Cited in the file of this patent

UNITED STATES PATENTS

| | | |
|---|---|---|
| 2,104,336 | Tuttle | Jan. 4, 1938 |
| 2,509,742 | Mynall | May 30, 1950 |
| 2,569,321 | Liguori | Sept. 25, 1951 |
| 2,575,073 | Selz | Nov. 13, 1951 |
| 2,581,124 | Moe | Jan. 1, 1952 |
| 2,668,237 | Okrent | Feb. 2, 1954 |

OTHER REFERENCES

Pub. 1, "Nonlinear Circuit Element Applications," Electronics, August, 1946, pp. 130–136.

Pub. 11, "The Application of Some Semiconnectors as Logarithmic Elements," Proceedings of the I. R. E., vol. 42, July 1954. Originally presented at the 1953 Southwestern I. R. E. Conference (February 5–7) pp. 1113–1116.